Dec. 20, 1966   V. N. MACKIW ETAL   3,293,027
METHOD OF LEACHING HIGH GRADE NICKEL MATTE
Filed July 20, 1964
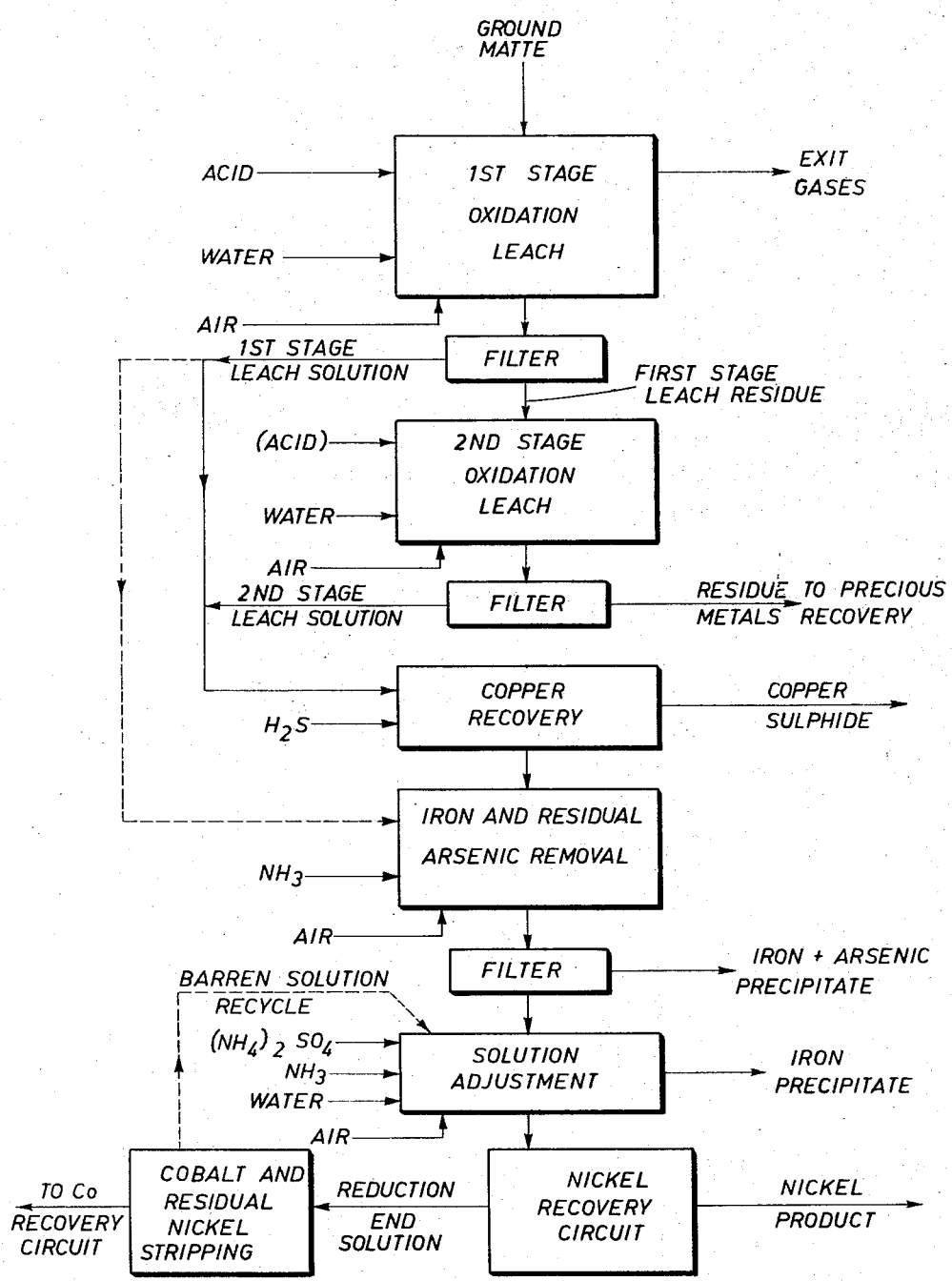
INVENTORS
VLADIMIR N. MACKIW
DAVID J.I. EVANS
BY: WASYL KUNDA
Agent

United States Patent Office 3,293,027
Patented Dec. 20, 1966

3,293,027
METHOD OF LEACHING HIGH GRADE NICKEL MATTE
Vladimir Nicolaus Mackiw, Fort Saskatchewan, Alberta, David John Ivor Evans, Edmonton, Alberta, and Wasyl Kunda, Fort Saskatchewan, Alberta, Canada, assignors to Sherritt Gordon Mines Limited, Toronto, Ontario, Canada, a corporation of Ontario
Filed July 20, 1964, Ser. No. 383,683
6 Claims. (Cl. 75—119)

This invention relates to a method for treating high grade nickel bearing matte. More specifically, it relates to an aqueous acid leaching process for treating matte which contains, in addition to nickel, cobalt, copper, sulphur and iron, at least one metal or metalloid compound of the group consisting of arsenic and antimony and one or more of the precious metals palladium, platinum, silver and gold, and wherein the nickel, cobalt and copper are extracted and dissolved in a leach solution substantially free from contamination with arsenic and/or antimony and the precious metals are concentrated in the leach residue.

The term "matte" is generally understood to apply to the impure, semi-metallic product of the smelting of sulphide ores and concentrates. As such, matte may have a wide range of compositions. However, the present invention is concerned primarily with matte containing a relatively high proportion of nickel, in the order of 60 to 75 percent, and lesser amounts of cobalt and copper (referred to hereinafter as associated non-ferrous metals) as well as iron, sulphur, some precious metals and relatively small but contaminating quantities of arsenic and/or antimony.

Various methods are known for treating such material for the separate recovery of the metal constituents in substantially pure form. These methods include pyrometallurgical processes, such as further smelting with various fluxes to purify the matte to a state where final refining may be carried out by electrolysis, and hydrometallurgical processes involving, generally, leaching in basic or acid media, solution purification and metals recovery operations.

Numerous hydrometallurgical processes for the treatment of mattes have been developed in recent years. These methods possess certain advantages over the older conventional methods. For example, hydrometallurgical processes are generally very flexible, permitting treatment of multi-constituent mattes containing a variety of valuable metals for the separate recovery of each of the metals. Further, some of these methods are readily adaptable for effective and efficient recovery of metals such as nickel and cobalt from the purified aqueous leach solutions in elemental powder form by direct reduction with hydrogen at elevated temperature and pressure.

Accordingly to the known hydrometallurgical methods, high grade nickeliferous matte, such as that with which the present invention is concerned, may be leached under oxidizing conditions in basic or acid media to solubilize the valuable metals while, as far as possible, the impurities are left in the insoluble residue. Leaching in basic media, such as aqueous ammoniacal solutions, is generally advantageous in the treatment of relatively simple mattes containing, for example, only nickel, copper, iron and sulphur. However, an acid leach is generally necessary for treating more complex material particularly where the material contains precious metals which it is desired to recover and/or has a relatively high cobalt content, i.e. in the order of 3 wt. percent or greater.

A serious problem is encountered, however, when the known acid oxidation leach processes are applied directly to high grade nickel matte containing arsenic or antimony in amounts even as low as 0.1% as the arsenic and antimony tend to dissolve in the leach solution in sufficient quantities to contaminate the final nickel product. This problem is particularly serious where the nickel is recovered from the leach solution by hydrogen reduction at elevated temperature and pressure since arsenic is precipitated from solution under the same conditions as the nickel. Inasmuch as the specification for arsenic in commercial grade nickel powder is less than 0.005% and for many special powders less than 0.001%, it can be readily appreciated that the leach solution treated for the recovery of the nickel must be very low in arsenic. For example, only 0.02 g.p.l. arsenic in a solution containing 45 g.p.l. nickel results in an arsenic level of 0.025%, 5 times the minimum specified, in the nickel powder reduced from the solution.

Ordinarily, it would appear to be a simple matter to remove arsenic from the leach solution by precipitating it as an insoluble iron arsenate, utilizing the iron content of the matte or providing iron from an external source. Canadian Patent No. 511,165, issued Mar. 22, 1955 to Chemical Construction Corporation discloses a process for treating arsenide-sulphide concentrates wherein arsenic is removed from a sulphuric acid leach solution in this manner. In the treatment of the arsenic bearing high grade nickel matte with which the present invention is concerned, however, it has been found that arsenic cannot be lowered to sufficiently low levels by the method of this patent without using retention times of such great length that the process becomes impractical for commercial purposes. In addition, the relatively high pH required to precipitate arsenic by this method also results in the precipitation of some basic nickel salts which can be filtered only with great difficulty.

The principal object of the present invention, therefore, is to provide an economic and efficient hydrometallurgical method for treating high grade nickel matte containing arsenic and/or antimony for the recovery of nickel substantially free from arsenic and/or antimony contamination.

Another object of this invention is to provide a method of leaching such matte which results in the dissolution of a minimum amount of contaminating arsenic and/or antimony such that removal of the contaminate can be effected rapidly and efficiently.

Another object of this invention is to provide a method of treating matte which allows for the recovery of precious metals as well as the nickel and associated non-ferrous metal values.

A still further object of the invention is to provide a process for treating matte wherein the above noted objects are achieved while substantially increasing the efficiency of the leaching operation.

In the simplest terms, the objects of the present invention are achieved by subjecting the high grade nickel matte to an oxidizing leach in aqueous acid media which is conducted in two separate stages rather than a single operation as is the conventional procedure. The first stage is continued only for a sufficient period of time to extract a portion of the non-ferrous metals and is terminated at a pH between about 3.5 to about 5.5 and preferably between about 4.5 to about 5.0. The undissolved residue from the first stage is subjected to a second leach at a pH in the range of from 1.5 to 2.5 which is continued for sufficient time to extract substantially all of the nickel and associated non-ferrous values from the residue. The leach solutions from each of the leaching stages can then be combined and treated in copper and iron removal circuits which also effect the removal of any minor amounts of arsenic dissolved during the two stage leach. The purified leach solution can then be adjusted for treatment by known hydrogen reduction techniques to recover the nickel and cobalt as substantially pure metal powders.

The invention is based on the surprising discovery that the amount of arsenic extracted and dissolved in the leach solution is very greatly reduced when the acid leach is conducted in two stages as outlined above rather than in a single stage conducted under the conditions that would normally be required to effect substantially complete extraction of the desired non-ferrous metal values. This is particularly surprising since the second stage of the two stage leach is conducted under conditions which, when employed in a single stage leach, result in the extraction of substantial quantities of arsenic and, further, the arsenic content of the residue leached in the second stage is substantially higher than that of the matte because of the concentration effect of the first stage leach where the bulk of the arsenic is rejected.

We have found that the use of a straightforward, single stage oxidizing leach results in the dissolution of an excessive amount of arsenic which can only be lowered to acceptable levels by procedures so time consuming and expensive as to render the process uneconomic for commercial use. On the other hand, we have found that by means of the two stage leach procedure described herein, a relatively small amount of arsenic is extracted and dissolved in the leach solution, and this small quantity of arsenic can be quickly and efficiently removed from solution. In general, the amount of arsenic extracted in the two stage procedure is less than ⅓ of that dissolved when the same material is leached in a one stage acid leach employing the same conditions of the second stage leach of the present invention. At the same time, the leaching efficiency of the two stage procedure is up to 30% greater than that of the one stage leach.

The invention is explained in detail hereinafter with reference to the overall process illustrated in the accompanying drawing. This process comprises a first stage leaching step, a liquid-solids separation step followed by a second stage leach in which the residue of the first leach is treated, a second liquid-solids separation step followed by copper removal steps, iron and residual arsenic removal steps, solution adjustment and nickel recovery steps.

The copper and nickel recovery steps indicated in the flow sheet are referred to only generally herein since the details of these steps do not form an essential part of the present invention. They are included in the description only to illustrate how the invention is utilized as a part of an overall process for treating high grade nickel matte.

The method is described only with reference to arsenic as the contaminating agent contained in the matte; however, it is to be understood that any references to behaviour of the arsenic in the process are also applicable to antimony.

In utilizing the two stage leach procedure of this invention in conjunction with the overall process illustrated, the matte is first subjected to conventional grinding treatment. Preferably, it is ground to a minimum of 80% minus 325 mesh Standard Tyler Screen. The ground matte is slurried with water and sulphuric acid to provide a pulp density of about 20 to about 40% by weight solids with the optimum pulp density for a given operation depending on the amount of nickel that is desired in the leach solution and operating factors such as the size and shape of the leaching vessel and the type of agitation provided.

The amount of sulphuric acid added is that required to give a total sulphur content in the slurry sufficient to satisfy the stoichiometric requirements of the non-ferrous metals as sulphates and preferably a slight excess over this amount. The exact quantity of sulphur provided as sulphuric acid in a given case will, of course, depend on the initial sulphur content of the matte. Generally, the mattes contemplated by this invention will be sulphur deficient and the deficiency is made up by the addition of the amount of acid calculated to give a total sulphur content equivalent to a total sulphur to non-ferrous metals molar ratio of at least about 1.0 and preferably about 1.05 to about 1.20.

The first stage leach is conducted at a temperature within the range of from about 250° F. to about 350° F., preferably 275° F. to 300° F., under oxidizing conditions created by feeding oxygen or a free oxygen bearing gas, such as air, into the leach solution under sufficient pressure to maintain an oxygen overpressure above about 5 p.s.i. and preferably about 20 to about 100 p.s.i. Higher pressures and temperatures can, of course, be employed but the increased cost of the equipment required will generally not be justified by any increase in extractions obtained by the more severe conditions. The reaction is exothermic once initiated and thus heat from an external source is required only at the outset of the reaction.

An essential feature of this invention is the control of the first stage leach such that the pH of the slurry discharged therefrom is between about 3.5 to about 5.5 and preferably between 4.5 and 5.0. The control of the first stage discharge pH within this critical range is achieved by controlling the time that the first stage leach is continued. Control of pH is achieved through control of leach time because the oxidation reaction in the first stage proceeds such that the free sulphuric acid provided in the make-up slurry first combines with the metallic nickel content of the matte with the result that the free acid content of the slurry initially is reduced and the pH rises. As the reaction is continued, the sulphides in the matte begin to oxidize and because of the oxidation of the iron sulphides and the hydrolysis of ferric sulphate in solution to basic ferric sulphate, the free acid increases again with an accompanying decrease in pH. Thus, it is a simple matter to control the pH in the desired range by terminating the first stage leach before the oxidation reaction has proceeded to a point where the free acid build-up reduces the pH below the minimum level of about 3.5. At this point, generally about 70 to 75 wt. percent of the nickel content of the matte will be leached and the bulk of the copper as well as the arsenic remains in the residue.

At the completion of the first stage leach, the residue, which contains all the precious metals and the bulk of the copper and arsenic, is separated from the solution by conventional liquid-solids separation procedures and is passed to the second stage leach. The leach solution containing dissolved values of nickel and cobalt and a small amount, generally less than 0.05 g.p.l., of arsenic may be combined with the second stage leach solution and passed to the subsequent copper recovery and iron removal steps; or, as indicated by the dotted line on the flow sheet, the copper recovery step may be by-passed if the amount of dissolved copper is not sufficient to contaminate the final nickel product.

The second stage oxidizing acid leach is conducted under the same general conditions of temperature and pressure as the first stage. The residue is slurried with process water to yield a pulp density in the range of 20% to 40% solids. Heat is applied if necessary, to initiate the oxidation reaction and the reaction is continued at a temperature of 250° F. to about 350° F. and under a partial pressure of oxygen above about 10 p.s.i. to extract substantially all the nickel and associated non-ferrous metal values from the first stage leach residue. The pH in this stage is dependent on the total sulphur to non-ferrous metals molar ratio in the first stage leach residue which is preferably about 1.05 to 1.20. If the total sulphur to non-ferrous metals molar ratio is properly adjusted as described above by addition of sulphuric acid prior to the first stage leach and the first stage leach is terminated at the proper point, the residue passed to the second stage leach will generally have a sulphur to metals ratio in the desired range of 1.05 to 1.20. Thus, it is generally not necessary to provide any additional acid in the second stage leach. However, if, for any reason, the total sulphur to non-ferrous metals molar ratio in the first stage leach residue is less than 1.0, acid can be provided in the second stage leach to make up the deficiency.

Under the conditions of the second stage leach, substantially all the nickel, cobalt and copper metal values in the first stage leach residue are extracted and dissolved in the leach solution, generally in less than about 3 hours. A small amount of arsenic, usually less than 0.1 g.p.l., is also extracted and dissolved in the second stage leach solution; however, the bulk of the arsenic and the precious metals remain in the residue. The amount of arsenic extracted is only a small fraction of that extracted if the matte is substantially completely leached with acid in one stage under the conditions normally required to extract economic amounts of the nickel, cobalt and copper from the matte.

The leach solution from the second stage leach, after separation from the residue by conventional liquid-solids separation procedures, is passed to subsequent solution purification steps, either separately or combined with the first stage leach solution.

The acid leach of this invention has the effect of concentrating the precious metals in the residue; thus the residue which contains, in addition to the precious metals, the bulk of the arsenic and iron and small residual quantities of nickel and associated non-ferrous metals can be treated directly for the recovery of the precious metals by conventional procedures such as cyanidation.

In the overall process illustrated in the accompanying flow sheet, the combined leach solution from the first and second stage leaches is first subjected to copper removal treatment, the object of which is to recover the copper as a sulphide concentrate containing less than 1% nickel and yield a solution containing less than 0.005 gram per litre of copper. Copper is effectively removed from the solution by precipitation with hydrogen sulphide. The preferred conditions for this operation are a temperature within the range of about 190° to about 260° F., a pH of about 1.5 to about 2.0, a hydrogen sulphide to copper mole ratio of about 2.5 to about 3.0 and a dissolved nickel plus cobalt content below about 120 grams per litre.

The copper stripped solution is next passed to an iron and residual arsenic removal step in which the solution pH is adjusted to about 4.0 to about 5.5 by the addition of a neutralizing agent such as ammonia. The solution is agitated at a temperature of about 150° F. to about 200° F. and aerated for a sufficient period of time to precipitate the bulk of the iron as iron hydroxide. During this operation, the arsenic content of the solution is readily lowered to specification levels provided the initial arsenic content is sufficiently low. Preferably, this should be less than 0.1 gram per litre; otherwise complete removal of the arsenic can be obtained only by the addition of very large amounts of iron from an extraneous source (with attendant filtration difficulties) and exceedingly lengthy retention times. Thus, the usefulness of this step as an economic, practical means of lowering the arsenic to the specified maximum level of about 0.005 g.p.l. or less is dependent on a low initial arsenic concentration in the solution treated. The two stage leach procedure of the present invention provides a simple but effective means of ensuring that matte leach solution contains a minimum amount of dissolved arsenic which can be readily lowered to specification levels by pH adjustment and/or the addition of iron where the solution is iron deficient. In the case of iron deficient solutions it is generally necessary to provide iron from an extraneous source such as in the form of iron oxide, to effect precipitation of the residual arsenic. The amount of iron required is generally at least 10 times the quantity of arsenic to be removed from solution.

In the overall process illustrated, the leach solution, after removal of iron and residual arsenic, is adjusted to condition if for recovery of the nickel by reduction with hydrogen at elevated temperature and pressure in accordance with known procedures. In the adjustment step, the leach solution is diluted with water and/or recycled reduction end solution derived from a previous reduction step to adjust the nickel content to within the range of about 45 to 55 grams per litre. Ammonia and ammonium sulphate are added to adjust the ammonia to nickel molar ratio to within the range of about 1.9 to 2.5 and the ammonium sulphate content to about 350 grams per litre respectively. Any residual iron not precipitated in the iron removal step can also be precipitated during this solution adjustment step by passing air into the solution to ensure complete oxidation and precipitation of the iron. Generally, the iron is quickly lowered to below 0.005 gram per litre at this point.

The clarified solution is then treated by known hydrogen reduction methods to precipitate substantially pure nickel in powder form. Any cobalt contained in the reduction end solution can be recovered by conventional means in a separate cobalt recovery circuit.

The effectiveness of the method of the present invention as a means of treating arsenic bearing, high grade nickel matte for the recovery of nickel is shown in the following examples. In the examples, samples of a high grade nickel matte obtained by smelting nickel sulphide concentrate from western Canada were used. This matte had the following analysis (in weight percent): nickel, 70.9; cobalt, 0.54; copper, 2.33; iron, 1.10; sulphur, 23.8; arsenic, 0.5.

EXAMPLE 1

A sample of high grade nickel matte having the above noted analysis was ground in a ball mill to 83% minus 325 mesh Standard Tyler Screen. 1200 grams of the ground matte were slurried with 6 litres of water to provide a pulp density of about 20% by weight solids. 760 grams sulphuric acid were added to give a total sulphur to none-ferrous metals molar ratio in the slurry of 1.17:1. The adjusted slurry was leached in an agitator equipped, corrosion resistant autoclave at 275° F. and under 20 p.s.i.g. oxygen overpressure. The leaching was continued for 60 minutes, the autoclave cooled and the leach solution, which had a pH of 1.4, separated from the undissolved residue by filtration. The leach solution analyzed 113 g.p.l. nickel, 0.8 g.p.l. cobalt, 0.3 g.p.l. copper, 1.4 g.p.l. iron, 0.25 g.p.l. arsenic. Extractions on an unwashed residue basis were nickel 90.7%, cobalt 77.8%, copper 12.1% and arsenic 58.6%.

EXAMPLE 2

A second sample of matte slurry was prepared in the manner outlined in Example 1 except that 2400 grams of matte and 12 litres of water were employed. Sulphuric acid was added to adjust the total sulphur content of the slurry to that equivalent to a molar ratio of sulphur to non-ferrous metals of 1.13 to 1. The slurry was leached in an agitator equipped, corrosion resistant autoclave at 275° F. and under 20 p.s.i.g. oxygen overpressure. The leaching was continued until the pH of the slurry reached 4.5, a period of 20 minutes. The leach solution after separation from the undissolved residue analyzed 106 g.p.l. Ni, 0.8 g.p.l. Co, 0.005 g.p.l. Cu, 0.07 g.p.l. Fe, 0.022 g.p.l. As. The unwashed residue, which contained 47.1% Ni, 5.9% Cu, 2.8% Fe, and 1.97% As was leached in 4.6 litres of water after adjustment of S/Ni+Co+Cu molar ratio to 1.13 by the addition of 78 grams of $H_2SO_4$ in a second oxidizing leach under the same conditions of oxygen overpressure and temperature as the first stage leach. The leach was continued for 1 hour. The pH of the discharge slurry was 1.3. The clarified leach solution analyzed 71.0 g.p.l. Ni, 0.7 g.p.l. Co, 0.8 g.p.l. Cu, 0.4 g.p.l. Fe, 0.16 g.p.l. As. Overall extractions were Ni 99.6%, Co 98.2%, Cu 13.3% and As 8.5%.

The results of Examples 1 and 2 demonstrate that the two stage leach procedure results in the extraction of substantially less arsenic than a one stage leach. In Example 2, the arsenic extracted was 8.5% whereas in the one stage procedure 58.6% of the As content of the matte was extracted. Also, it can be noted that in the two stage leach 80 minutes were required to extract over 98% of the nickel and cobalt of matte from 2400 grams of matte while in the one stage leach, only 90.7 and 77.8% nickel and cobalt extractions were obtained from 1200 grams in 60 minutes. Thus, for each unit of reaction volume, the two stage procedure results in the extraction of 1.65 × the weight of non-ferrous metal values extracted by the one stage procedure per unit leaching time.

EXAMPLE 3

Arsenic removal, by addition of iron as iron oxide, was caried out on two leach solution samples analyzing as follows:

|        | Ni  | Co   | Cu    | Fe    | S    | As    | pH  |
|--------|-----|------|-------|-------|------|-------|-----|
| No. 1  | 104 | 0.76 | 0.022 | 0.055 | 57.4 | 0.071 | 2.9 |
|        |     |      |       |       | (2 stage leach) | | |
| No. 2  | 116 | 0.86 | 2.8   | 0.33  | 64.0 | 0.24  | 1.9 |
|        |     |      |       |       | (1 stage leach) | | |

To a 1 l. charge of samples of each solution a varied quantity of leach tailings from a NiS concentrate leaching process containing 47.6% Fe as iron oxide was added and the solution was kept agitated at 180° F. for a period of from 15 to 180 minutes. On completion of the test, the solution was filtered and analyzed for As. The results of these tests, given in Table I show that As can be lowered below the maximum allowable within a very short period where the initial arsenic content is low as it is in the case of the solution from the two stage leach, whereas in the case of the high arsenic solution obtained in a one stage leach As content is not lowered to specification levels even after 2 hours retention time and addition of 15 g.p.l. tailings.

TABLE I

Removal of Arsenic from Nickel Leach Solution by Treatment with Iron Oxide

[Conditions: 180° F.]

| Investigated Variables | Head Solution Containing: | |
|---|---|---|
|  | 0.071 g.p.l. As (No. 1) | 0.24 g.p.l. As (No. 2) |
| Quantity of tailings additions:[1] | | |
| 1 g.p.l. | 0.029 | 0.24 |
| 2 g.p.l. | 0.030 | 0.29 |
| 5 g.p.l. | 0.009 | 0.24 |
| 10 g.p.l. | 0.0055 | 0.17 |
| 15 g.p.l. | 0.0024 | 0.12 |
| Retention time (min.)[2]: | | |
| 15 | 0.0083 | 0.20 |
| 30 | 0.0052 | 0.19 |
| 60 | 0.0042 | 0.17 |
| 120 | 0.0046 | 0.16 |

[1] 60 min retention time.
[2] 10 g.p.l. tailing.

EXAMPLE 4

Samples of solutions 1 and 2 from Example 3 were treated with ammonia to raise the pH to within the range of 4.5 to 5.0. The adjusted solutions were agitated and air was passed through them to effect precipitation of the As. After 2 hours solution No. 1 contained 0.0057 g.p.l. arsenic and after 24 hours solution No. 2 still contained 0.20 g.p.l. of As. When the pH of solution No. 1 was raised to 5.5 in an effort to precipitate more of the arsenic, copious quantities of basic nickel sulphate precipitated which could be filtered only with great difficulty.

The method of this invention possesses a number of important advantages. Firstly, it allows the bulk of the arsenic content of matte subjected to treatment to be rejected in the residue thus eliminating the need for expensive and time consuming arsenic removal procedures. The method also results in substantially increased leaching efficiency and permits the recovery of precious metals in the form of a concentrate in the residue. A further advantage of the present two stage process is that, in most cases, the leach solution from the first stage leach (about ¾ of the total leach solution volume) is substantially copper and iron free and may therefore be passed directly to the nickel recovery step with further purification.

It will be understood that modifications may be made to the process of this invention without departing from the scope of the invention defined by the appended claims.

What we claim as new and desire to protect by Letters Patent of the United States is:

1. In a process for leaching nickel and associated non-ferrous metal values from high grade nickel matte containing, in addition to nickel, sulphur and iron, at least one precious metal of the group comprising palladium, platinum, silver and gold and at least one metalloid compound of the group consisting of arsenic and antimony in which the matte is leached under oxidizing conditions in finely divided form at elevated temperature and pressure in an aqueous sulphuric acid solution, the improved procedure for increasing leaching efficiency, ensuring minimum dissolution of arsenic and antimony in the leach solution and concentrating the precious metals in the leach residue which comprises the steps of: forming a slurry of finely ground matte in aqueous sulphuric acid solution, the total sulphur content of said slurry being at least the stoichiometric amount required to combine with the non-ferrous metals content of the slurry as sulphates; subjecting said slurry to a first stage leach at a temperature above said 250° F. and under a partial pressure of oxygen above about 10 p.s.i.; terminating said first stage leach at a slurry pH in the range of about 3.5 to about 5.5; separating the first stage leach solution from the undissolved residue and subjecting said first stage residue to a second stage leach at a temperature above about 250° F. and under a partial pressure of above about 10 p.s.i., continuing said second stage leach to extract substantially all the nickel and associated non-ferrous values contained in the matte, separating the second stage leach solution from the undissolved residue, treating said solution and the first stage leach solution to remove copper and iron therefrom and treating the purified leach solution for the recovery therefrom of substantially pure nickel and cobalt.

2. The method according to claim 1 in which the first stage leach is conducted at a temperature in the range of about 275° F. to about 300° F. and is terminated at a pH in the range of about 4.5 to about 5.0.

3. The method according to claim 1 in which the residue from the second stage leach is passed to a precious metals recovery operation.

4. The method according to claim 1 in which the leach solution from the first stage leach is passed directly to the nickel and cobalt recovery steps without treatment for copper and iron removal.

5. The method according to claim 1 in which copper is removed from the leach solution by reaction of the solution with hydrogen sulphide and iron and residual arsenic are precipitated by adjusting the solution pH to about 4.5 to 5.0 by the addition of ammonia.

6. The method according to claim 1 in which residual arsenic is removed from the second stage leach solution by addition of iron in amount in excess of ten times the arsenic content of the solution.

References Cited by the Examiner

UNITED STATES PATENTS

| 981,451 | 1/1911 | McKechnie et al. | 75—101 |
| 2,686,114 | 8/1954 | McGauley et al. | 75—119 |
| 2,718,455 | 9/1955 | McCormick | 75—101 |
| 3,174,849 | 3/1965 | Mackiw et al. | 75—119 |

DAVID L. RECK, *Primary Examiner.*

N. F. MARKVA, *Assistant Examiner.*